(12) United States Patent
Elnozahy

(10) Patent No.: US 6,442,680 B1
(45) Date of Patent: *Aug. 27, 2002

(54) METHOD AND SYSTEM FOR COMPRESSING REDUCED INSTRUCTION SET COMPUTER (RISC) EXECUTABLE CODE

(75) Inventor: Elmootazbellah Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/239,259

(22) Filed: Jan. 29, 1999

(51) Int. Cl.⁷ ................................................. G06F 9/30
(52) U.S. Cl. ...................................... 712/227; 712/209
(58) Field of Search ......................... 712/24, 240, 227, 712/209, 210; 375/240; 341/51, 55, 63, 65, 67, 95, 106; 717/5; 380/269

(56) References Cited

U.S. PATENT DOCUMENTS

| | | | | |
|---|---|---|---|---|
| 5,045,852 A | * | 9/1991 | Mitchell et al. | 341/51 |
| 5,463,746 A | * | 10/1995 | Brodnax et al. | 712/240 |
| 5,680,600 A | | 10/1997 | Childers et al. | |
| 5,703,907 A | * | 12/1997 | James | 375/240 |
| 5,729,228 A | | 3/1998 | Franaszek et al. | |
| 5,764,994 A | | 6/1998 | Craft | |
| 5,878,267 A | * | 3/1999 | Hampapuram et al. | 712/24 |
| 5,943,421 A | * | 8/1999 | Grabon | 380/269 |
| 5,945,933 A | * | 8/1999 | Kalkstein | 341/63 |
| 5,946,489 A | | 8/1999 | Yellin et al. | |
| 6,005,503 A | | 12/1999 | Burrows | |
| 6,121,903 A | * | 9/2000 | Kalkstein | 341/63 |
| 6,125,201 A | | 9/2000 | Zador | |

OTHER PUBLICATIONS

"Improving Code Density Using Compression Techniques" by Lefurgy et al., 1997.*

(List continued on next page.)

*Primary Examiner*—Richard L. Ellis
(74) *Attorney, Agent, or Firm*—Casimer K. Salys; Bracewell & Patterson, L.L.P.

(57) ABSTRACT

A method and system for a compression scheme used with program executables that run in a reduced instruction set computer (RISC) architecture such as the PowerPC is disclosed. Initially, a RISC instruction set is expanded to produce code that facilitates the removal of redundant fields. The program is then rewritten using this new expanded instruction set. Next, a filter is applied to remove redundant fields from the expanded instructions. The expanded instructions are then clustered into groups, such that instructions belonging to the same cluster show similar bit patterns. Within each cluster, the scopes are created such that register usage patterns within each scope are similar. Within each cluster, more scopes are created such that literals within each instruction scope are drawn from the same range of integers. A conventional compression technique such as Huffman encoding is then applied on each instruction scope within each cluster. Dynamic programming techniques are then used to produce the best combination of encoding among all scopes within all the different clusters. Where applicable, instruction scopes are combined that use the same encoding scheme to reduce the size of the resulting dictionary. Similarly instruction clusters are combined that use the same encoding scheme to reduce the size of the resulting dictionary.

21 Claims, 2 Drawing Sheets

OTHER PUBLICATIONS

"Custom Instruction Sets for Code Compression" by Fraser et al., 1995.*

"An Object Code Compression Approach to Embedded Processors" by Yoshida et al., 1997.*

"High Speed Pattern Matching for a Fast Huffman Decoder" by Choi et al., 1995.*

"Code Compression Based on Operand Factorization" by Araujo et al., 1998.

"Evaluation of a High Performance Code Compression Method" by Lefurgy et al, 1999.

Ernst et al., Code Compression, Proceedings of the 1997 ACM SIGPLAN conference on Programming language design and implementation, Jun. 16–18, 1997, Las Vegas, NV.*

Proebsting, Todd A., Optimizing an ANSI C Interpreter with Superoperators, Papers of the $22^{nd}$ ACM SIGPLAN–SIGACT symposium on Principles of programming languages, Jan. 23–25, 1995, San Francisco, CA.*

Lekatsas et al., Code Compression for Embedded Systems, Proceedings of the 35th annual confrence on Design automation conference, Jun. 15–19, 1998, San Francisco, CA.*

Lekatsas, et al., Code Compression for Embedded Systems, ACM, Jun. 1998, pp. 516–521.

Breternitz, Jr., et al., Enhanced Compression Techniques to Simplify Program Decompression and Execution, IEEE, Apr. 1997, pp. 170–176.

Arnavut, Block Sorting and Compression, IEEE, Apr. 1997, pp. 181–190.

Lefurgy, et al., Improving Code Density Using Compression Techniques, *IEEE*, Jan. 1997, pp. 194–203.

Kirovski, Darko, et al., Procedure Based Program Compression, IEEE, 1997, pp. 204–213.

Araujo, Guido, et al., Code Compression Based on Operand Factorization, IEEE, 1998, pp. 194–201.

Okuma, T., et al., Instruction Encoding Techniques for Area Minimization of Instruction ROM, IEEE, 1998, pp. 125–130.

Related Copending application: Elnozahu, Ser. No. 09/239,260, filed Jan. 29, 1999.

Related Copending application: Elnozahu, Ser. No. 09/239,261, filed Jan. 29, 1999.

Related Copending application: Elnozahy et al., Ser. No. 09/239,258, filed Jan. 29, 1999.

Tong L. Yu, "Data Compression for PC Software Distribution," Software–Practice and Experience, vol. 26(11), pp. 1181–1195, Nov. 1996.

Christopher Fraser Et Al., "Custom Instruction Sets for Code Compression," pp. 1–9, Oct. 19, 1995.

Jens Ernst, "Code Compression," University of Arizona, pp. 358–365.

* cited by examiner

METHOD AND SYSTEM FOR COMPRESSING REDUCED INSTRUCTION SET COMPUTER (RISC) EXECUTABLE CODE

RELATED CO-PENDING APPLICATION

This application relates to co-pending applications, entitled "METHOD AND SYSTEM FOR COMPRESSING REDUCED INSTRUCTION SET COMPUTER (RISC) EXECUTABLE CODE THROUGH INSTRUCTION SET EXPANSION" application Ser. No. 09/239,260, filed on Jan. 29, 1999, now U.S. Pat. No. 6,195,743, "METHOD AND SYSTEM FOR CLUSTERING INSTRUCTIONS WITHIN AN EXECUTABLE CODE FOR COMPRESSION" application Ser. No. 09/239,261 filed on Jan. 29, 1999, now U.S. Pat. No. 6,317,867, and "METHOD AND SYSTEM FOR SCOPE-BASED COMPRESSION OF REGISTER AND LITERAL ENCODING IN A REDUCED INSTRUCTION SET COMPUTER (RISC)" application Ser. No. 09/239,258 filed on Jan. 29, 1999, now U.S. Pat. No. 6,233,674, all filed of even date herewith and assigned to the assignee herein named, the subject matter of each of which is incorporated herein by reference.

BACKGROUND OF THE INVENTION

1. Technical Field

The present invention relates to a method and system for compressing data in general, and in particular to a method and system for compressing executable code in the context of Reduced Instruction Set Computer (RISC) architectures.

2. Description of the Prior Art

Reduced Instruction Set Computer (RISC) architectures simplify processor and compiler design by making all instructions have the same size and follow a few simple formats. A price to pay for these advantages is the relatively large size of program code written using these instruction sets. The large code size reduces instruction cache effectiveness. It also increases program-loading time when code is shipped over in a network environment or retrieved from a slow mechanical device like a disk.

Currently, network computers, embedded controllers, set-top boxes and other hand-held devices receive executables over the network or possibly slow phone links or communication channels. These devices may have very limited memory capacity and when their memory is constrained, large programs may not fit in the available memory to run on the device. Therefore, for RISC processors to be competitive in the market place, it is necessary to have highly efficient code compression that mitigates the disadvantage of large executable sizes.

Programs written in RISC instruction sets have traditionally been difficult to compress. There are several reasons for this.

First, RISC instructions contain redundant fields. These fields pollute the data space and reduce the effectiveness of the data model that a traditional compressor builds during compression, thereby reducing the compression ratio. Furthermore, a traditional compressor will still encode these redundant fields even if they do not convey any information.

Second, because the instructions typically take several formats, it is often difficult to discern patterns in the instructions within program code.

Third, RISC instructions use registers extensively, and compressing register encoding is very difficult because they are densely coded with very large information entropy.

Fourth, the values of literals vary widely with no discernible pattern or frequent use.

Therefore there is a need for compressing instructions in a Reduced Instruction Set Computer (RISC) architecture such as the PowerPC family. Traditional compressors in the prior art treat the instructions in a program as a stream of bits, and try to find patterns within this stream to help construct a more compact presentation of the program (e.g. Ziv Lempel compression, Huffman encoding, etc.). However, consecutive instructions within a program may not easily exhibit patterns that a compressor can exploit. Therefore a need exists for:

removing redundancy from instructions processing the program to expose more patterns for a traditional compressor such that it can be more effective in compression.

Devising a coding scheme for registers and literals to expose more patterns.

The present invention solves these problems by presenting a technique in a novel and unique manner, which is not previously known in the art.

SUMMARY OF THE INVENTION

In view of the foregoing, it is therefore an object of the present invention to provide an improved method and system for compressing executable code in the context of a Reduced Instruction Set Architecture (RISC).

It is another object of the present invention to provide an improved method and system for performing data compression by removing redundancy from the instructions through expanding the existing architecture to include artificial instructions encoded such that there is no redundancy.

It is yet another object of the present invention to provide an improved method and system which produces compression ratios between 3.5 to 4, compared to the 2 to 2.6 range of conventional compression.

It is still yet another object of the present invention to provide an improved method and system, which utilizes compression techniques that exploit the semantics of an instruction set architecture and where traditional compression techniques work in association to produce highly compressed code.

In accordance with a method and system of the present invention, a compression scheme for program executables that run in a reduced instruction set computer (RISC) architecture such as the PowerPC is disclosed. Initially, a RISC instruction set is expanded to produce code that facilitates the removal of redundant fields. The program to be compressed is rewritten using this new expanded instruction set. Next, a filter is applied to remove redundant fields from the expanded instructions. The expanded instructions are then clustered into groups, such that instructions belonging to the same cluster show similar bit patterns. The grouping could be done based on the instruction formats. For example, one may group branch instructions in one cluster, load/store instructions in one cluster, and so on. However, some instructions do not fall under this model, and for which there may be a need for a more sophisticated clustering mechanism. Within each cluster, scopes are created such that register usage patterns within each scope are similar. Within each cluster, further scopes are created such that literals within each scope are drawn from a close range of integers. A conventional compression technique such as Huffman encoding is then applied on each scope within each cluster. Furthermore, Huffman encoding is also applied on the opcodes of all instructions, thus making these opcodes function as anchors within the compressed stream. Dynamic programming techniques are then used to produce the best combination of encoding among all scopes within all the different clusters. As a result of using dynamic programming, scopes and clusters may be combined that use the same encoding scheme to reduce the size of the resulting dictionary.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
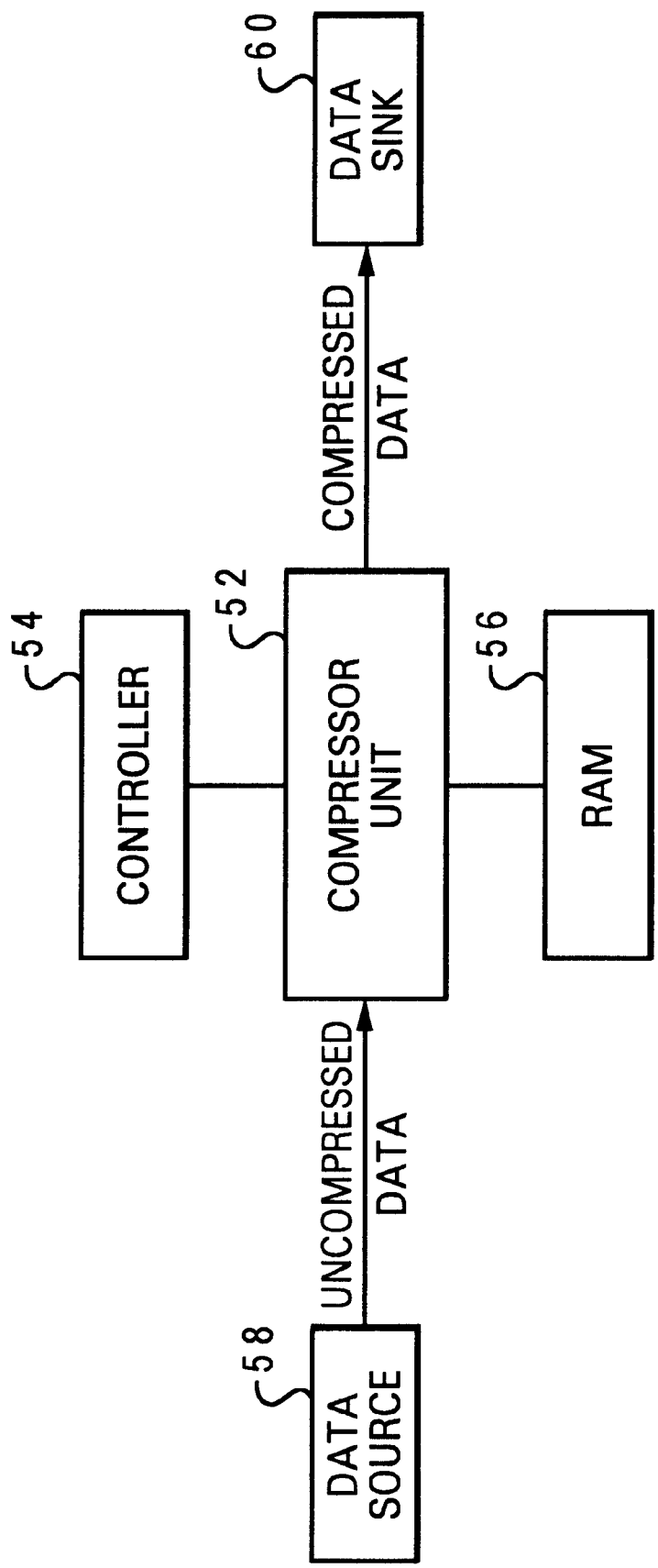
FIG. 1 is a block diagram of a compressor unit in which a preferred embodiment of the present invention may be incorporated.

Those who are skilled in the art will appreciate that this invention could be implemented in hardware or in software. With reference now to the figures and in particular with reference to FIG. 1, there is depicted a block diagram of a data compressor unit in which a preferred embodiment of the present invention may be incorporated. As shown, compressor unit 52 is coupled to a controller 54 and a random-access memory (RAM) 56. All data structures associated with the combination of the different compression mechanisms are maintained within RAM 56. Controller 54 stores all permanent logic for the compressor. During operation, compressor unit 52 receives from data source 58 the executable program. After data encoding in accordance with the preferred embodiment of the present invention, a compressed data stream is then transmitted to a data sink 60. This sink could be a storage device or a communication channel.

Figure 2:
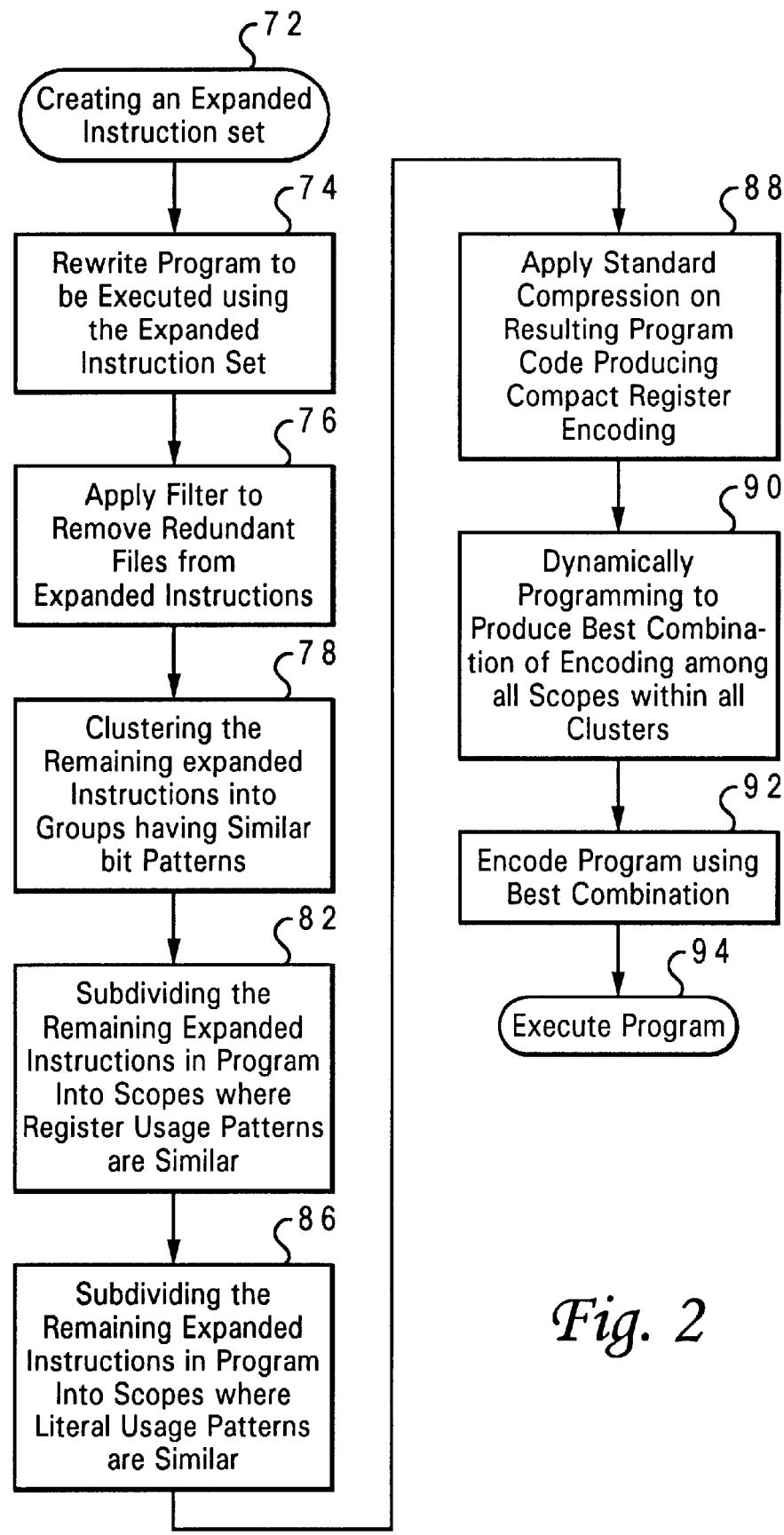
FIG. 2 is a high-level flowchart showing the steps for compression in accordance with a preferred embodiment of the invention.

Referring now to FIG. 2, a high-level flowchart showing the steps for performing the compression in accordance with a preferred embodiment of the present invention is shown. In accordance with the method and system of the present invention a new technique for rewriting a program using an expanded instruction set designed specifically to eliminate redundancy in the instruction encoding is disclosed. As shown in step 72, the reduced instruction set computer (RISC) code is expanded to produce code that facilitates the removal of redundant fields. The uniform encoding of RISC instruction sets often generates redundant information or low entropy. A traditional compressor does not exploit any knowledge about the instruction set, and therefore will attempt to compress the various fields or the instruction itself as if they were an opaque stream of bits. One type of method which may be used for expanding the fields of an instruction set is disclosed and claimed in applicant's co-pending application entitled "Method and System for Compressing Reduced Instruction Set Computer (RISC) Executable Code Through Instruction Set Expansion" application Ser. No. 09/239,260 filed on Jan. 29, 1999. However, any method that expands the fields within an instruction set for the removal of redundant fields may be used in accordance with the present invention. Note however that step 72 is a one-time step that is executed only once per RISC architecture. The results of the execution produce an expanded instruction set that is stored for future use on any program to be compressed.

Next, in step 74, the program is rewritten using the expanded instruction set created in step 72. Utilizing those expanded instructions required to rewrite the program, a filter is applied in step 76 to remove the redundant fields from the expanded instruction set.

The technique then, as shown in step 78, clusters the remaining expanded instructions into groups, such that instructions belonging to the same cluster show common patterns. When compressing executable code of a computer program, a compressor would not achieve the best results because the sequence of instructions according to the order in which they appear in a program may not easily reveal common patterns that could be exploited in compression. A straightforward method is to group instructions using the same format into one cluster. Further subdivisions are also possible within instructions using the same format, based on the semantic grouping of instructions. However, while most instructions could be grouped in this fashion, there will always be instructions that do no fit this categorization scheme. For such instructions, a more sophisticated clustering technique is needed. On such technique which may be used for clustering the expanded instruction set is disclosed and claimed in applicant's co-pending application entitled "Method and System for Clustering Instructions Within Executable Code for Compression" application Ser. No. 09/239,260 filed on Jan. 29, 1999. However, any method that clusters an instruction set for common patterns may be used in accordance with the present invention.

Referring once again to FIG. 2, within each cluster, scopes are created within the remaining expanded instructions in step 82 such that register usage patterns within each scope are similar. Using a pre-processing phase where the binary of the program is rewritten such that some conventions for register usage are adhered to could enhance this step. RISC compilers tend to use all registers. Therefore, a conventional compressor examining the register fields in instructions will have more difficulty in finding frequent patterns. One type of method which may be used for subdividing the expanded instruction set based on register usage is disclosed and claimed in applicant's co-pending application entitled "Method and System for Scope-Based Compression of Register and Literal Encoding in a Reduced Instruction Set Computer (RISC)" application Ser. No. 09/239,260 filed on Jan. 29, 1999. However, any method that subdivides an instruction set for register usage may be used in accordance with the present invention.

Additionally, within each cluster, further scopes are created within the remaining expanded instructions in step 86 such that literal usage patterns within each instruction scope are similar. Compressing literals poses a similar problem to that of compressing registers. However, one type of method which may be used for subdividing the expanded instruction set based on literal usage is disclosed and claimed in applicant's co-pending application entitled "Method and System for Scope-Based Compression of Register and Literal Encoding in a Reduced Instruction Set Computer (RISC)" (IBM Docket No. AT9-98436). However, any method that subdivides an instruction set for literal usage may be used in accordance with the present invention. Different traditional or standard compression techniques are then applied on the resulting scopes, as shown in step 88. Several combination are produced tentatively. For example, several conventional compression techniques can be applied on each scope within each cluster (e.g. Huffman encoding, Ziv Lempel encoding, run-length encoding, bit-length encoding, etc.) at any time.

Dynamic programming techniques are then used in step 90 to produce the best combination of encoding among all instruction scopes within all the different clusters. The scopes that use the same compression scheme are combined to reduce the size of the resulting dictionary, if such grouping reduces the size of the compressed code. Similarly, the clusters that use the same compression schemes are combined, if such grouping reduces the size of the compressed code. Dynamic programming thus will find the best possible combination among scopes, clusters and compression techniques. The final compressed program is then produced as shown in step 92 and executed in step 94.

As described above, this invention defines a method and system that combines use of three compression techniques in one overall new and novel scheme to compress RISC programs. The use of different compression schemes within different fields of an expanded RISC instruction set results from the first compression technique. The fields are then organized as different instruction scopes within different clusters that are produced by the second and third compression techniques. Using dynamic programming to produce the best encoding for combining instruction scopes that are compressed, reduces the size of dictionaries and produce a highly compressed code for use in execution.

It is also important to note that although the present invention has been described in the context of a hardware compressor, those skilled in the art will appreciate that the mechanisms of the present invention can be implemented in software and be distributed as a program product in a variety of forms, and that the present invention applies equally regardless of the particular type of signal bearing media utilized to actually carry out the distribution. Examples of signal bearing media include but are not limited to recordable type media such as floppy disks or CD ROMs, and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for compressing an instruction set, comprising the steps of:
    expanding executable code within said instruction set to produce expanded instruction code for facilitating removal of redundant fields;
    clustering instructions within said expanded instruction code that have similar bit patterns;
    dividing said clusters into instruction scopes based on register and literal usage, wherein said dividing includes:
        determining discernible patterns for said instructions based on more register usage than register usage over the entire instruction set, and specifying register scopes within said instructions based on said determination; and
        determining discernible patterns within said instructions based on more literal usage than literal usage over the entire instruction set, and specifying literal scopes within said instructions based on said determination; and
    performing bit-level compression of the expanded, clustered, and divided instruction code.

2. The method of claim 1, further comprising the step of:
    performing dynamic programming techniques among all said instruction scopes to select the best compression combination within all different clusters.

3. The method of claim 1, wherein said bit-level compression further comprises the step of using Huffman encoding.

4. The method of claim 1, further comprising the step of filtering redundant fields from said said expanded instruction code.

5. The method of claim 1, further comprising the step of:
    clustering said instructions based on instruction-level formatting.

6. The method of claim 1, further comprising the step of rewriting said expanded instruction code into an expanded executable instruction set.

7. The method of claim 1, wherein said instruction set is a reduced instruction set computer instruction set.

8. An information handling system, comprising:
    processing means for expanding executable code within said instruction set to produce expanded instruction code for facilitating removal of redundant fields;
    processing means for clustering instructions within said expanded instruction code that have similar bit patterns;
    processing means for dividing said clusters into instruction scopes based on register and literal usage, including processing means for:
        determining discernible patterns for said instructions based on more register usage than register usage over the entire instruction set, and specifying register scopes within said instructions based on said determination; and
        determining discernible patterns within said instructions based on more literal usage than literal usage over the entire instruction set, and specifying literal scopes within said instructions based on said determination; and
    processing means for performing bit-level compression of the expanded, clustered, and divided instruction code.

9. The information handling system according to claim 8, comprising:
    processing means for dynamically combining scopes and clusters that utilize a same bit-level compression scheme.

10. The information handling system according to claim 8, wherein said processing means for performing bit-level compression comprises processing means for Huffman encoding.

11. The information handling system according to claim 8, further comprising processing means for filtering redundant fields from said expanded instruction code.

12. The information handling system according to claim 8, further comprising:
    processing means for clustering said instructions based on instruction-level formatting.

13. The information handling system of claim 8, further comprising processing means for rewriting said expanded instruction code into an expanded executable instruction set.

14. The information handling system of claim 8, wherein said instruction set is a reduced instruction set computer instruction set.

15. A computer program product residing on computer usable media, comprising:
    program code means for expanding executable code within said instruction set to produce expanded instruction code for facilitating removal of redundant fields;

program code means for clustering instructions within said expanded instruction code that have similar bit patterns;

program code means for dividing said clusters into instruction scopes based on register and literal usage, including program code means for:

determining discernible patterns for said instructions based on more register usage than register usage over the entire instruction set, and specifying register scopes within said instructions based on said determination; and determining discernible patterns within said instructions based on more literal usage than literal usage over the entire instruction set, and specifying literal scopes within said instructions based on said determination; and program code means for performing bit-level compression of the expanded, clustered, and divided instruction code.

16. The computer program product according to claim 15, comprising:

program code means for dynamically combining scopes and clusters that utilize a same bit-level compression scheme.

17. The computer program product according to claim 15, wherein said program code means for performing bit-level compression comprises program code means for Huffman encoding.

18. The computer program product according to claim 15, further comprising program code means for filtering redundant fields from said expanded instruction code.

19. The computer program product according to claim 15, further comprising:

program code means for clustering said instructions based on instruction-level formatting.

20. The computer program product of claim 15, further comprising program code means for rewriting said expanded instruction code into an expanded executable instruction set.

21. The computer program product of claim 15, wherein said instruction set is a reduced instruction set computer instruction set.

* * * * *